US010140784B1

(12) United States Patent
Philosof et al.

(10) Patent No.: US 10,140,784 B1
(45) Date of Patent: Nov. 27, 2018

(54) WIRELESS INTRA-VEHICLE COMMUNICATION AND INFORMATION PROVISION BY VEHICLES

(71) Applicant: GM Global Technology Operations LLC, Detroit, MI (US)

(72) Inventors: Tal Philosof, Givatayim (IL); Eilon Riess, Zikron-Yaakov (IL); Yohay Buchbut, Pardes-Hanna (IL)

(73) Assignee: GM GLOBAL TECHNOLOGY OPERATIONS LLP, Detroit, MI (US)

( * ) Notice: Subject to any disclaimer, the term of this patent is extended or adjusted under 35 U.S.C. 154(b) by 0 days.

(21) Appl. No.: 15/603,753

(22) Filed: May 24, 2017

(51) Int. Cl.
*H04B 7/00* (2006.01)
*G07C 5/00* (2006.01)
*B60R 16/023* (2006.01)
*G08G 1/16* (2006.01)
*G05D 1/00* (2006.01)
*H04W 84/18* (2009.01)

(52) U.S. Cl.
CPC .......... *G07C 5/008* (2013.01); *B60R 16/0231* (2013.01); *G05D 1/0077* (2013.01); *G08G 1/16* (2013.01); *H04W 84/18* (2013.01)

(58) Field of Classification Search
CPC .......... G07C 5/008; G08G 1/16; H04W 84/18
USPC ........................................... 455/66.1, 96, 99
See application file for complete search history.

(56) References Cited

U.S. PATENT DOCUMENTS

2014/0094992 A1* 4/2014 Lambert ................ G07C 5/008 701/1
2014/0306814 A1* 10/2014 Ricci ....................... H04W 4/21 340/425.5
2015/0266411 A1* 9/2015 Bennie .................. B60W 10/06 701/36

* cited by examiner

*Primary Examiner* — Ayodeji Ayotunde
(74) *Attorney, Agent, or Firm* — Cantor Colburn LLP

(57) ABSTRACT

A vehicle-based system and a method of performing communication include one or more in-vehicle devices configured to obtain data. A controller obtains the data from the one or more in-vehicle devices. A first wireless communication unit associated with one or more of the one or more in-vehicle devices transmits data from the one or more of the one or more in-vehicle devices to the controller wirelessly.

7 Claims, 3 Drawing Sheets

WIRELESS INTRA-VEHICLE COMMUNICATION AND INFORMATION PROVISION BY VEHICLES

INTRODUCTION

The subject invention relates to wireless intra-vehicle communication and information provision by vehicles.

Vehicles are increasingly equipped with sensors that gather information about the environment. Exemplary vehicles include automobiles, construction equipment, farm equipment, and automated factory equipment. Sensors can include, for example, still and video cameras, radar systems, and lidar systems. The sensor information can enhance applications such as, for example, driver warning systems, collision avoidance systems, and autonomous driving systems. Sensors and other information gathering devices provide data to a central controller that includes, for example, a telematics unit that communicates with recipients such as other vehicles, mobile devices, and a central server. When communication within the vehicle is conducted over wires, dedicated wiring is necessary between each pair of communicating nodes (e.g., from each sensor to the central controller and telematics unit). The need for dedicated wiring requires preplanning and additional resources. Further, information provided by the vehicle to outside recipients can duplicate already available information. Accordingly, it is desirable to provide wireless intra-vehicle communication and processing of information to be provided by the vehicle.

SUMMARY

In one exemplary embodiment, a vehicle-based system includes one or more in-vehicle devices to obtain data, and a controller to obtain the data from the one or more in-vehicle devices. A first wireless communication unit associated with one or more of the one or more in-vehicle devices transmits data from the one or more of the one or more in-vehicle devices to the controller wirelessly.

In addition to one or more of the features described herein, the one or more in-vehicle devices are sensors including a camera, a radar, or a lidar.

In addition to one or more of the features described herein, the one or more in-vehicle devices includes a braking system, a collision avoidance system, or an electronic control unit (ECU).

In addition to one or more of the features described herein, the system also includes a second wireless communication unit in the controller to receive the data from the one or more of the one or more in-vehicle devices.

In addition to one or more of the features described herein, the second wireless communication unit transmits commands to one or more of the first wireless communication units.

In addition to one or more of the features described herein, the controller receives information from one or more external devices that are external to a vehicle and transmits processed information to the one or more external devices.

In addition to one or more of the features described herein, the controller generates the processed information from the information, and the controller foregoes transmission of duplicate information to the one or more external devices.

In another exemplary embodiment, a method of performing communication by a vehicle includes configuring each of one or more in-vehicle devices to include a first wireless communication unit. Each of the first wireless communication units wirelessly transmits data obtained by the respective in-vehicle device. The method also includes configuring a controller of the vehicle to include a second wireless communication unit. The second wireless communication unit receives the data from the one or more in-vehicle devices via the respective first wireless communication units.

In addition to one or more of the features described herein, the method also includes configuring the controller to receive information from one or more external devices that are external to the vehicle.

In addition to one or more of the features described herein, the method also includes configuring the controller to include processing circuitry to process the data from the one or more in-vehicle devices and the one or more external devices.

In addition to one or more of the features described herein, the controller generates commands to one or more of the one or more in-vehicle devices and transmits information to one or more of the one or more external devices and foregoes transmission of duplicate information to the one or more of the one or more external devices.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
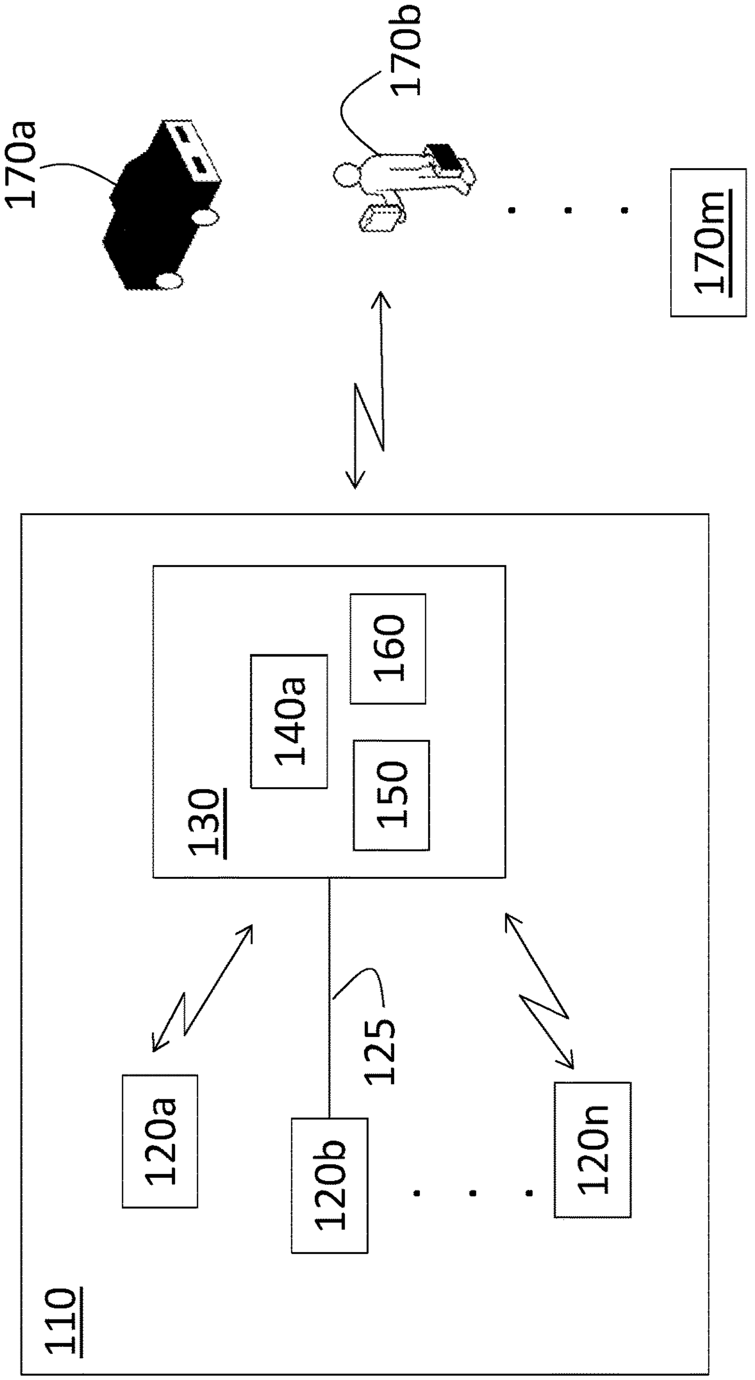
FIG. 1 is a block diagram of systems within a vehicle that communicate wirelessly according to one or more embodiments.

The following description is merely exemplary in nature and is not intended to limit the present disclosure, its application or uses. It should be understood that throughout the drawings, corresponding reference numerals indicate like or corresponding parts and features.

As previously noted, sensor information can enhance applications like driver warning systems, autonomous driving, and collision avoidance systems. When sensor information is shared among vehicles and with other recipients, the received sensor information can further enhance object detection and avoidance activities and other applications. The communication of sensor-based information from one vehicle to another vehicle or other recipients first requires intra-vehicle communication between the sensors and a communications unit such as a known automobile telematics unit. Currently, this intra-vehicle communication is conducted through wiring within the vehicle. Dedicated wiring for intra-vehicle communication requires pre-planning. The wiring also results in a narrow bandwidth (e.g., 1 megabit per second). This limited throughput is not conducive to the communication of some sensor data such as, for example, streaming video. The wiring also results in additional weight and components (e.g., connectors). The physical wiring also adds to the assembly time of the vehicle. Sharing information among vehicles and other recipients also benefits from processing to ensure that duplicate transmissions are minimized.

Embodiments of the systems and methods detailed herein relate to wireless intra-vehicle communication to a controller and processing of information received from within and outside the vehicle by the controller for transmission to other recipients. For example, a vehicle that does not have sensors of its own can receive information from a vehicle that does have sensors. Vehicles can receive information about another vehicle that does not have communication capabilities. Vehicles can relay or broadcast information, such as safety messages, as needed.

In accordance with an exemplary embodiment of the invention, FIG. 1 is a block diagram of systems within a vehicle 110. The systems include in-vehicle devices 120*a* through 120*n* (generally referred to as 120). These in-vehicle devices 120 can be sensors (e.g., camera, lidar, radar) and vehicle systems (e.g., braking system, electronic control unit (ECU), collision avoidance system), for example. The in-vehicle devices 120 can communicate wirelessly with a controller 130. In addition, one or more in-vehicle devices 120 may communicate over a wired bus 125 (e.g., controller area network (CAN) bus). The controller 130 includes an intra-vehicle communication unit 140*a*, which is further detailed with reference to FIG. 2, and an external communication unit 160 to communicate outside the vehicle 110 with external devices 170*a* through 170*m* (generally, 170).

The controller 130 also includes processing circuitry 150 that may include an application specific integrated circuit (ASIC), an electronic circuit, a processor (shared, dedicated, or group) and memory that executes one or more software or firmware programs, a combinational logic circuit, and/or other suitable components that provide the described functionality. The processing circuitry 150 processes the data obtained from one or more in-vehicle devices 120 through the communication unit 140*a* and data obtained from one or more external devices 170 through the external communication unit 160. The processing circuitry 150 can also generate commands for one or more of the in-vehicle devices 120. The commands can change operation parameters or operation states of the in-vehicle devices 120. The controller 130 can be part of or can be coupled to one or more of the in-vehicle devices 120 such as the collision avoidance and autonomous driving system. The CAN bus is generally used for wired communication of safety messages in the vehicle 110 and may relay messages from the controller 130 to one or more in-vehicle devices 120 such as other systems and controllers in the vehicle 110.

The controller 130 further includes a telematics unit or, generally, an external communication unit 160 to transmit information processed by the processing circuitry 150 using data from one or more in-vehicle devices 120 or external devices 170. The transmission from the vehicle 110 external communication unit 160 can be to a variety of external devices 170. For example, the external device 170*a* shown in FIG. 1 may be another vehicle that obtains transmissions through vehicle-to-vehicle (V2V) communication with the vehicle 110. As another example, the external device 170*b* is used by a pedestrian and obtains transmissions from the vehicle 110 via vehicle to pedestrian (V2P) communication. Other exemplary external devices 170 include smart road signs and traffic lights, a server, or any other object equipped with a receiver to receive vehicle-to-everything (V2X) communication from the vehicle 110. The V2X communication, of which V2V and V2P are two specific examples, generally refers to messages that include an identifier of the message, a header that describes the data content, and the payload with the data content. One type of V2V message uses a dedicated short-range communication (DSRC) protocol. The DSRC protocol dictates the frequency, physical layer protocol, and other specifics of the message. The V2X communication can be conducted over a cellular network (e.g., $4^{th}$ generation long-term evolution (LTE) or $5^{th}$ generation).

The data or information communicated from the controller 130 of the vehicle 110 to an external device 170 can include streaming video from an in-vehicle device 120, for example. The communication between the in-vehicle device 120 and controller 130 must have sufficient throughput to facilitate such data. Exemplary intra-vehicle communication formats include the dedicated short range communication (DSRC) protocol or 10 or 20 megahertz (MHz) DSRC channels that are different that the channels used for V2V communication, other wireless bands (e.g., 2.4 gigahertz (GHz) or 5 GHz), and wireless technology such as WiFi or any other wireless or cellular technology. The communication transmitted by the vehicle 110 can be in a known format such as a message in the dedicated short range communication (DSRC) spectrum. The DSRC spectrum includes several channels. According to an exemplary embodiment, one of the DSRC channels can be allocated to communication from in-vehicle devices 120 to the controller 130 within the vehicle 110.

Wireless communication between in-vehicle devices 120 and the controller 130 within the vehicle 110 not only facilitates increased throughput but also eliminates issues associated with routing of wires, the weight of wires, connectors between wires, and assembly time to establish wired communication. At the same time, wireless communication between in-vehicle devices 120 and the controller 130 within the vehicle 110 raises issues of inter-vehicle interference and intra-vehicle interference. Intra-vehicle interference can be addressed with one or a combination of known bandwidth sharing techniques (e.g., time division multiple access (TDMA), frequency division multiple access (FDMA), code division multiple access (CDMA), spatial division multiple access (SDMA)). Inter-vehicle interference can be controlled based on the metal shielding of the vehicle as well as adjustment of transmit power (i.e., reduced power for intra-vehicle communication).

An exemplary data rate for sensor data is 1000 bytes per 100 milliseconds (ms) per object. For ten exemplary objects, the average data rate is then 100 kilobytes per second (kbps) per sensor. The typical CAN bus that is used for wired intra-vehicle communication can carry 500 kbps. A next generation bus, called CAN FD, can carry up to 8 megabytes per second (MBps), but Wi-Fi rates can be on the order of 100s of MBps for a single antenna. Thus, wireless intra-vehicle communication can handle up to 1000 sensors. In addition to the metal shielding and power adjustment discussed previously, vehicles 110 that are each performing wireless intra-vehicle communication can share bandwidth to address inter-vehicle interference. For example, when each vehicle 110 has ten in-vehicle devices 120, up to a hundred vehicles 110 can share a channel with sufficient isolation based on the previously discussed exemplary data rates.

The vehicle 110 can both send and receive information from the external devices 170. When the controller 130 receives information from an in-vehicle device 120 or an external device 170, the controller 130 can process the information to determine whether and in what form to send the information. For example, when data is received from an in-vehicle device 120 that is a radar or lidar, the controller 130 may transmit only a list of objects and their identified locations to external devices 170 via the external communication unit 160. When information is received from an external device 170, the controller determines if that information should be sent to one or more other external devices 170. For example, when another vehicle is the external device 170 that sends information to the vehicle 110 and the information is a location of the other vehicle, the controller 130 determines, based on the message recipients, if the information should be broadcast to other external devices 170 (e.g., vehicles, road signs, pedestrian-operated devices) or if the information has already been provided to the other external devices 170 such that a broadcast would duplicate the information.

Figure 2:
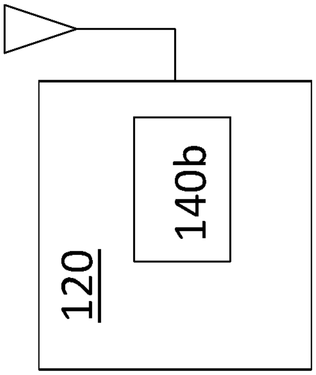
FIG. 2 is a block diagram of an intra-vehicle communication unit in a sensor according to one or more embodiments.

FIG. 2 is a block diagram of an intra-vehicle communication unit 140*b* in a sensor according to one or more embodiments. Each in-vehicle device 120 can include an intra-vehicle communication unit 140*b*. As shown in FIG. 1, the controller 130 also includes an intra-vehicle communication unit 140*a*. The intra-vehicle communication unit 140*a* that is part of the controller 130 can be a receive-only unit that only receives sensor data from one or more in-vehicle devices 120 or can both transmit and receive according to alternate embodiments. The controller 130 can transmit intra-vehicle commands to in-vehicle devices 120, for example. The intra-vehicle communication unit 140*b* that is part of one or more of the in-vehicle devices 120 can be a transmit-only unit that only transmits sensor data from the in-vehicle device 120 to the controller 130. The intra-vehicle communication unit 140*b* can both transmit and receive according to alternate embodiments. The in-vehicle device 120 can receive commands from the controller 130, for example. As previously noted, the intra-vehicle communication facilitated by the intra-vehicle communication units 140*a*, 140*b* can be DSRC messages, Wi-Fi communication at other frequencies (e.g., 2.4 GHz or 5 GHz), or any wireless system, or cellular.

Figure 3:
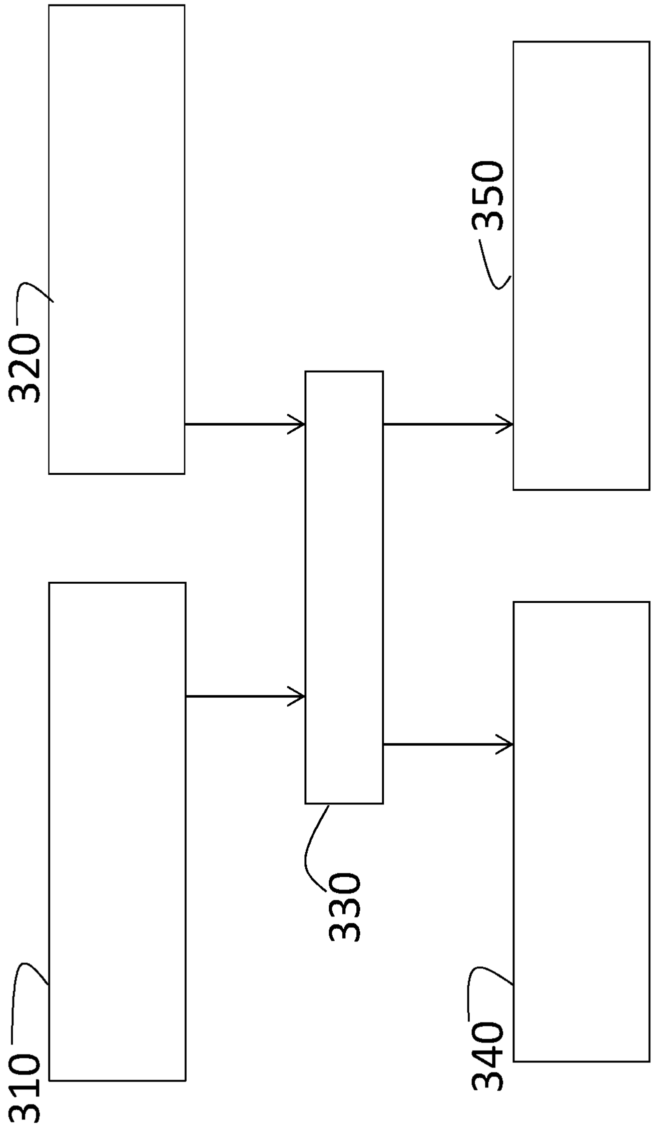
FIG. 3 is a process flow of a method of performing wireless intra-vehicle communication and information sharing by a vehicle according to one or more embodiments.

FIG. 3 is a process flow of a method of performing wireless intra-vehicle communication and information sharing by a vehicle 110 according to one or more embodiments. The processes shown in FIG. 3 are performed by the controller 130. At block 310, receiving information from one or more in-vehicle devices 120 includes receiving sensor information or information from an in-vehicle system such as the collision avoidance system or braking system, for example. Receiving information from one or more external devices 170, at block 320, includes receiving information from a pedestrian device or vehicle with a current position, for example. Processing information, at block 330, includes determining different information based on the received information such as determining detected objects and their locations from received radar data, for example. Processing information, at block 330, also includes identifying duplicate information that has already been broadcast. Determining whether information would be duplicated also includes determining if additional information is being added. That is, a given vehicle (external device 170) may broadcast its position only, but if the controller 130 of the vehicle 110 receives information from one or more in-vehicle devices 120 that augments the broadcast (e.g., velocity, direction of travel), the controller 130 may still broadcast the additional information (at block 350) because it is not entirely duplicated from the broadcast.

At block 340, transmitting one or more intra-vehicle commands is to one or more in-vehicle devices 120 based on information received from within or outside the vehicle 110. For example, information received via the external communication unit 160 of the controller 130 from an external device 170 (e.g., pedestrian) regarding his position can facilitate the controller 130 generating an intra-vehicle command to an in-vehicle device 120 that is a radar to track the pedestrian. Transmitting information to external devices 170, at block 350, includes re-broadcast of information received from other external devices 170 if they are not mere duplicates. The processing circuitry 150 of the controller 130 can compare received information via the external communication unit 160 with information to be transmitted, for example, to determine duplication. According to alternate embodiments, the processing circuitry 150 can determine other recipients of information obtained from an external device 170 to determine if re-transmitting that information will result in duplication. Transmitting information to the external devices 170, at block 350, can also include transmission of information generated by one or more in-vehicle devices 120 to one or more external devices 170.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the description not be limited to the particular embodiments disclosed, but will include all embodiments falling within the scope of the application.

What is claimed is:

1. A vehicle-based system, comprising:

one or more in-vehicle devices configured to obtain data;

a controller configured to obtain the data from the one or more in-vehicle devices; and a first wireless communication unit associated with one or more of the one or more in-vehicle devices, the first wireless communication units configured to transmit data from the one or more of the one or more in-vehicle devices to the controller wirelessly, wherein the controller is further configured to receive information from one or more external devices that are external to a vehicle and transmit processed information to the one or more external devices, to generate the processed information from the information, and to forego transmission of duplicate information to the one or more external devices.

2. The system according to claim 1, wherein the one or more in-vehicle devices are sensors including a camera, a radar, or a lidar.

3. The system according to claim 1, wherein the one or more in-vehicle devices includes a braking system, a collision avoidance system, or an electronic control unit (ECU).

4. The system according to claim 1, further comprising a second wireless communication unit in the controller, wherein the second wireless communication unit is configured to receive the data from the one or more of the one or more in-vehicle devices.

5. The system according to claim 4, wherein the second wireless communication unit transmits commands to one or more of the first wireless communication units.

6. A method of performing communication by a vehicle, the method comprising:

configuring each of one or more in-vehicle devices to include a first wireless communication unit, wherein each of the first wireless communication units is configured to wirelessly transmit data obtained by the respective in-vehicle device; and configuring a controller of the vehicle to include a second wireless communication unit, wherein the second wireless communication unit is configured to receive the data from the one or more in-vehicle devices via the respective first wireless communication units, to receive information from one or more external devices that are external to the vehicle, to generate commands to one or more of the one or more in-vehicle devices, and to transmit information to one or more of the one or more external devices and forego transmission of duplicate information to the one or more of the one or more external devices.

7. The method according to claim 6, further comprising configuring the controller to include processing circuitry to process the data from the one or more in-vehicle devices and the one or more external devices.

* * * * *